United States Patent [19]

Fox, Jr.

[11] 4,132,395

[45] Jan. 2, 1979

[54] SHOCK ABSORBER WITH IMPROVED EXTENSION DAMPING

[76] Inventor: Robert C. Fox, Jr., 555 Middlefield Rd. - #N303, Mountain View, Calif. 94040

[21] Appl. No.: 852,468

[22] Filed: Nov. 17, 1977

[51] Int. Cl.² .................................................. F16F 9/08
[52] U.S. Cl. ................................. 267/64 R; 137/539; 188/269; 188/298; 188/314
[58] Field of Search ............... 188/314, 269, 282, 317, 188/322, 298; 267/64 R, 65 R; 137/539

[56] References Cited

U.S. PATENT DOCUMENTS

| | | | |
|---|---|---|---|
| 2,467,098 | 4/1949 | Rossman | 188/322 X |
| 3,003,594 | 10/1961 | De Carbon | 188/317 |
| 3,302,662 | 2/1967 | Webb | 137/539 |
| 3,410,549 | 11/1968 | Cheak | 267/64 R |
| 3,469,661 | 9/1969 | Hoffmann et al. | 188/317 X |
| 3,625,321 | 12/1971 | Lutz | 188/317 X |
| 3,706,362 | 12/1972 | Faure | 188/317 X |

FOREIGN PATENT DOCUMENTS

| | | | |
|---|---|---|---|
| 18984 | 8/1956 | Fed. Rep. of Germany | 188/314 |
| 546899 | 8/1956 | Italy | 188/317 |

*Primary Examiner*—George E. A. Halvosa
*Attorney, Agent, or Firm*—Phillips, Moore, Weissenberger, Lempio & Majestic

[57] ABSTRACT

A shock absorber, particularly adapted for use in the rear suspension of a motorcycle, comprises a tubular housing having a piston reciprocally mounted therein. A first chamber is defined between the housing and the head end of the piston whereas a second chamber is defined between the rod end of the piston and the housing. An inflatable bladder is disposed in a hollow rod of the piston and defines the third chamber with the rod which is in open communication with the first chamber. The chambers are at least partially filled with oil and the first chamber and bladder are air-pressurized to selectively set the spring rates of the shock absorber. A plurality of circumferentially disposed ports are formed through a head of the piston and are normally closed by a spring washer to prevent communication of oil from the first chamber to the second chamber upon extension of the shock absorber and for permitting such communication upon compression thereof. An orifice is also formed through the head of the piston to meter oil from the second chamber to the first chamber upon extension of the shock absorber. A check valve is also mounted in the head to cooperate with the orifice to also meter fluid from the second chamber to the first chamber upon extension of the shock absorber and when the differential pressure of the oil between the first and second chambers exceeds a predetermined level.

11 Claims, 6 Drawing Figures

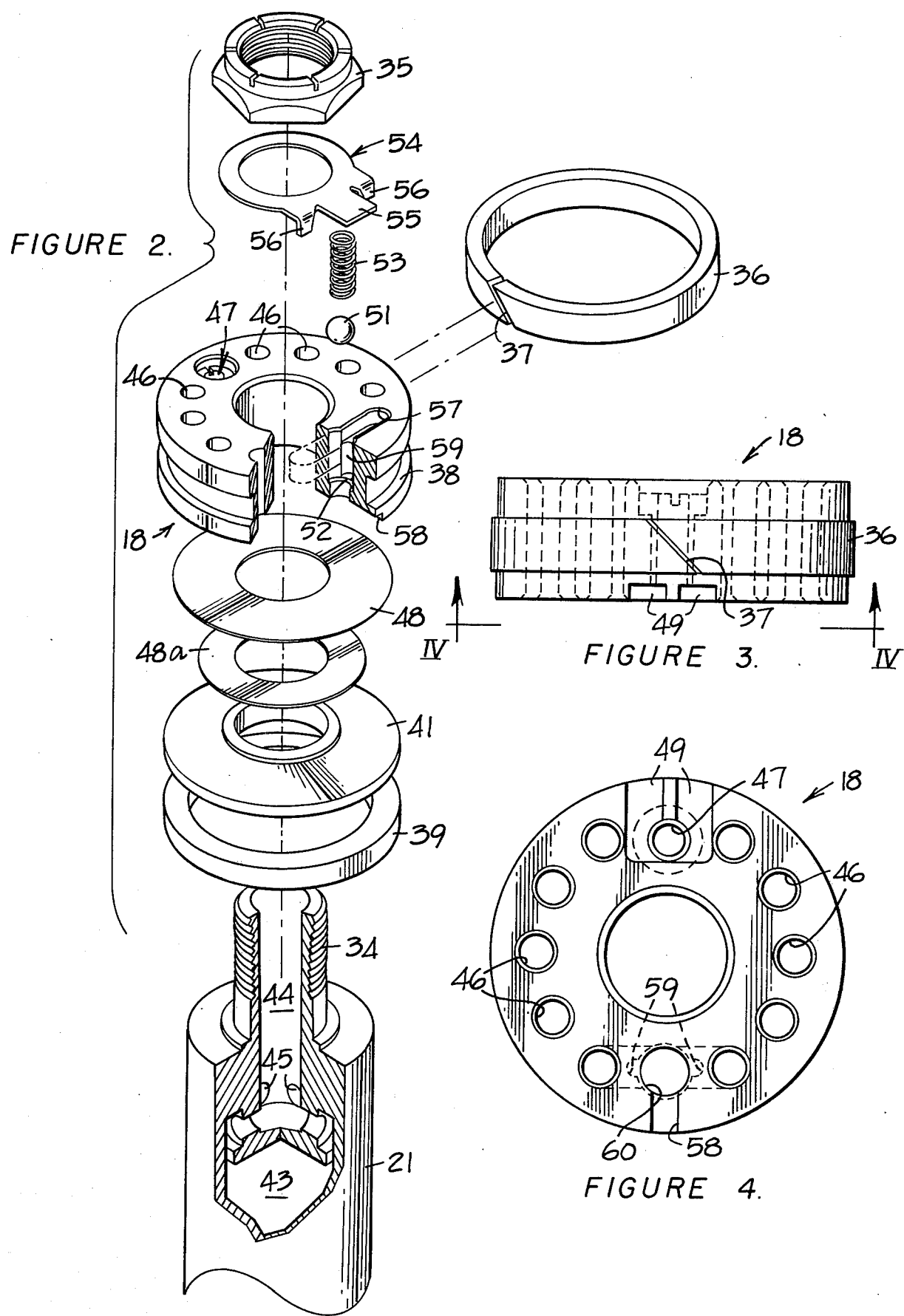

SHOCK ABSORBER WITH IMPROVED EXTENSION DAMPING

BACKGROUND OF THE INVENTION

This invention relates to a shock absorber of the type employed in the rear suspension for a motorcycle.

Shock absorbers of this type are subjected to heavy duty wear and thus require closely controlled compression and extension damping to provide controlled ride characteristics. In addition, it is desirable to promote maximum stability and traction with the ground. Highly successful shock absorbers of this type are now marketed by Moto-X Fox, Inc. of Campbell, California.

Such a shock absorber comprises a housing having a piston reciprocally mounted therein to define first and second chambers on either side of a head of the piston. The shock absorber is adapted to be partially filled with oil and the first chamber, disposed at the head end of the pistion, is adapted to be air-pressurized. A plurality of ports are formed through the head of the piston and are normally closed by an annular spring washer mounted beneath the head. Upon compression of the shock absorber, the spring washer will function as a bypass valve to communicate oil from the first chamber to the second chamber.

A pair of orifices are also formed through the head to communicate the first and second chambers and function to meter fluid from the second chamber to the first chamber upon extension of the shock absorber. The first chamber further openly communicates with a third chamber defined in the hollow rod of the piston. An inflatable bladder is mounted in the rod and is adapted to be air-pressurized to aid in closely controlling the spring rate of the shock absorber upon compression thereof.

As will be hereinafter described, the shock absorber of this invention constitutes an improvement over the above-described shock absorber and substantially improves extension damping thereof.

SUMMARY OF THE INVENTION

An object of this invention is to provide an improved shock absorber with improved extension damping. The shock absorber comprises a tubular housing, a piston reciprocally mounted in the housing and a ring mounted on a head of a piston to define first and second chambers between the head and housing adapted to retain a first fluid, such as oil, therein. The first chamber is adapted to be pressurized with a second fluid, such as air, and an inflatable bladder, disposed in a hollow rod of the piston, is also adapted to be air-pressurized to thus selectively tune the spring rates of the shock absorber by varying the air pressures in the first chamber and in the bladder. The bladder defines a third chamber with the piston, which is in open communication with the first chamber, and orifice means, formed through the head of the piston, functions to meter oil from the second chamber to the first chamber upon extension of the shock absorber.

The improvement herein comprises check valve means mounted in the head of the piston for preventing communication of oil from the first chamber to the second chamber, upon compression of the shock absorber, and for cooperating with the orifice means, upon extension of the shock absorber, to open to also meter fluid from the second chamber to the first chamber when the differential pressure of the oil between the first and second chambers exceeds a predetermined level. As described hereinafter, such cooperation between the orifice means and the check valve means provides highly desirable extension damping characteristics nowhere found in the prior art.

BRIEF DESCRIPTION OF THE DRAWINGS

Other objects of this invention will become apparent from the following description and accompanying drawings wherein:

FIG. 2 is an exploded view of a piston employed in the shock absorber;

FIG. 3 is an enlarged front elevational view illustrating a head of the piston;

FIG. 4 is a bottom plan view of the head of the piston;

DETAILED DESCRIPTION OF THE PREFERRED EMBODIMENT

Figure 1:
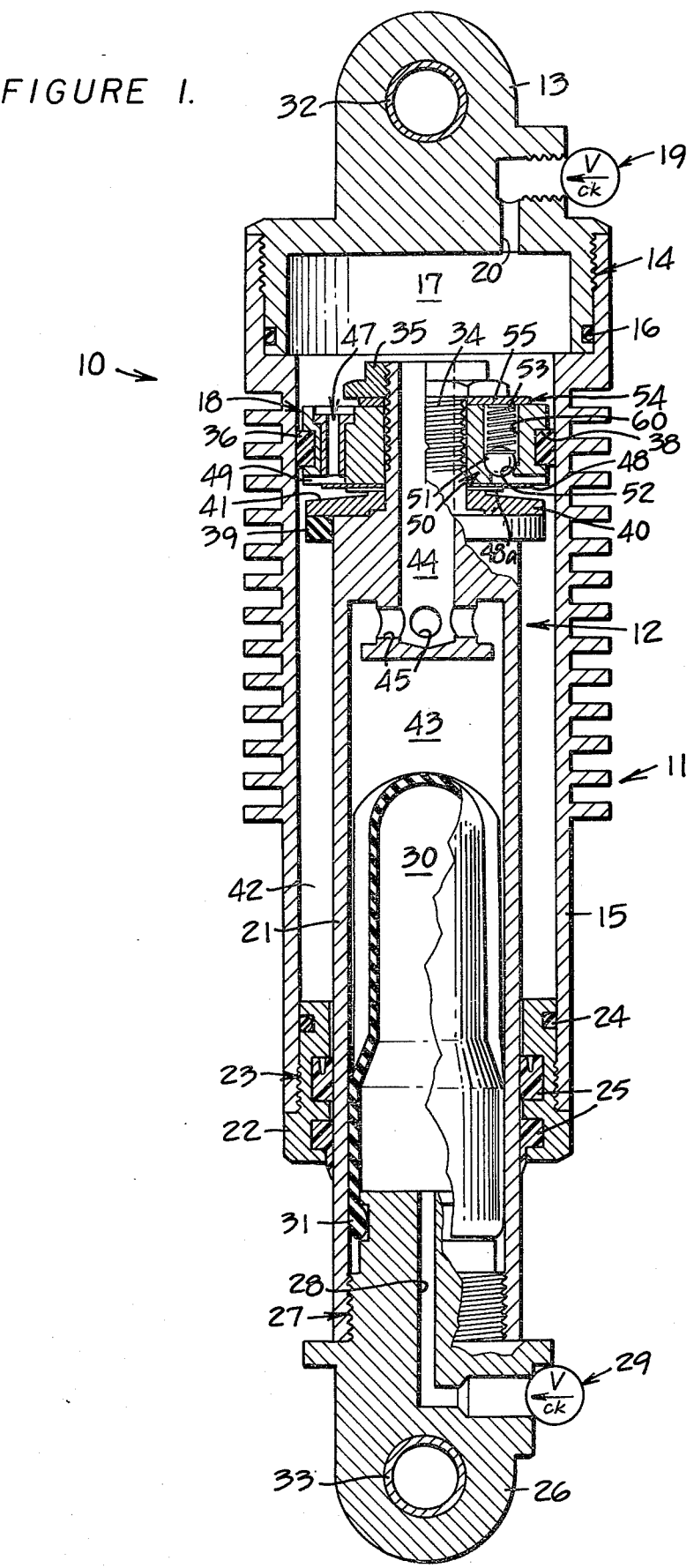
FIG. 1 is a longitudinal sectional view of a shock absorber embodying this invention.

FIG. 1 illustrates a shock absorber 10 comprising a tubular housing 11 partially filled with oil and having a piston 12 reciprocally mounted therein. The housing comprises an end cap 13 threadedly mounted at 14 to a main body 15 thereof and an O-ring seal 16 suitably mounted between the end cap and the main body for sealing purposes. A first chamber 17, defined between end cap 13 of the housing and a head 18 of piston 12, is adapted to be air-pressurized via a standard air valve 19 and a passage 20 suitably formed in the end cap.

A hollow rod 21 of piston 12 is reciprocablly mounted in an annular collar 22 threadably mounted at 23 to main body 15 of the housing. An O-ring seal 24 is suitably mounted between body 15 and collar 22 whereas a pair of shaft and wiper seals 25 are suitably mounted between the collar and piston rod 21 for sealing purposes. One end of rod 21 has a cap 26 threadably mounted thereon at screw threads 27 with the latter cap having a passage 28 formed therein.

A standard air valve 29 is adapted to pressurize an inflatable bladder 30 via passage 28 for purposes hereinafter explained. The bladder has an annular bead 31 formed on the open end thereof which seats in sealing contact within an annular recess formed on cap 26. The bladder may be composed of a standard elastomeric material, such as rubber. Cylindrical bushings 32 and 33 are mounted in caps 13 and 26, respectively, to adapt the shock absorber for mounting in the rear suspension of a motorcycle, for example.

Referring to FIGS. 1 and 2, piston head 18 is suitably mounted on a threaded end 34 of piston rod 21 and retained thereon by a nut 35. An annular piston ring 36 is split at 37 to adapt it for mounting in an annular groove 38, formed about the periphery of head 18. The piston ring may be composed of tetrafluoroethylene (Teflon) or other suitable ring material.

A cylindrical bumper 39, which may be composed of polyurethane, is secured to an upper end of rod 21 to cushion the piston in the event of its engagement with the upper surface of collar 22, upon extreme extension of the shock absorber. An annular spacer ring 40 is mounted on stem 34 of piston rod 21 and has a frusto-conically shaped surface 41 formed thereon. Such surface defines an annular gap between the spacer ring and piston 18 to permit communication of oil between first chamber 17 and a second annular chamber 42, defined between head 18 and housing 11.

A third chamber 43 is defined in hollow piston rod 21 and above bladder 30 and is in open communication with chamber 17 via a longitudinal passage 44 and a plurality of radial ports 45. As will be hereinafter more fully explained, upon compression of the shock absorber oil in chamber 17 will be forced downwardly through passage 44 and port 45 to chamber 43 and will also be forced into chamber 42 via a plurality of circumferentially disposed ports 46, formed through piston head 18 (FIGS. 2-4). Oil will also communicate from chamber 17 to chamber 42 via a closely toleranced orifice means 47, defined in a bushing secured in the piston head.

It should be noted in FIG. 1 that ports 46 are normally closed by an annular spring washer 48, mounted on stem 34 of piston rod 21. An annular washer 48a underlies the spring washer and has an outside diameter less than that of the spring washer to permit the periphery of the spring washer to flex when it is subjected to a predetermined level of fluid pressure in chamber 17 bearing thereagainst. The spring washer thus functions as a one-way valve whereby compression of the shock absorber will permit the valve to open to communicate chamber 17 with chamber 42 via ports 46. It should be noted that radial passages 49 are formed on the underside of piston head 18 to continuously communicate chambers 17 and 42 via orifice means 47.

An improvement to the above-described shock absorber comprises a check valve means 50 mounted in piston head 18, preferably in diametric opposition to orifice means 47. The check valve means functions to prevent communication of oil from chamber 17 to chamber 42 upon compression of the shock absorber and cooperates with orifice means 47 to also meter fluid from chamber 42 to chamber 17 in a controlled manner upon extension of the shock absorber and when the differential oil pressure between chamber 42 and chamber 17 exceeds a predetermined level. The check valve means comprises a ball 51 normally mounted on a semispherical seat 52 and a compression coil spring 53 for normally biasing the ball into engagement with the seat. A clamping means or ring 54, mounted on stem 34 of the piston rod and retained thereon by nut 35, has a finger portion 55 which overlies spring 53 to retain it in its operative position.

A pair of bent retaining lugs 56 are formed on the clamping ring and disposed on either side of portion 55 thereof to engage a recess 57 formed on the upper side of piston head 18. The lugs function to prevent circumferential displacement of the clamping ring relative to the piston head. It should be noted that a radial passage 58 is formed on the underside of the piston head to continuously communicate chamber 42 with the inlet to check valve means 50 at seat 52 thereof. It should be further noted in FIGS. 2 and 4 that a pair of longitudinally disposed slots 59 are defined on either side of spring chamber 60 to communicate chambers 17 and 42 upon opening of check valve means 50.

In operation and assuming the shock absorber 10 is at its fully extended condition of operation in FIG. 1, upon compression of the shock absorber the increase in oil pressure in chamber 17 will function to open spring washer 47 to communicate pressurized oil from chamber 17 to chamber 42 via ports 46. A limited amount of oil will also meter through orifice means 47. The resultant compression damping provides a controlled response which automatically adjusts to the severity of bumps encountered by the rear wheel of the motorcycle.

This "dual pressure" feature, i.e., dictated by the pressure settings of air valves 19 and 29, provides a two-stage air spring rate which, experience has shown, affords significant advantages in tailoring spring rate to a variety of terrain conditions. In particular, such feature provides tuneability which is not possible when a "single pressure" design is employed, i.e., a single air valve providing a single pressure setting.

Figure 5:
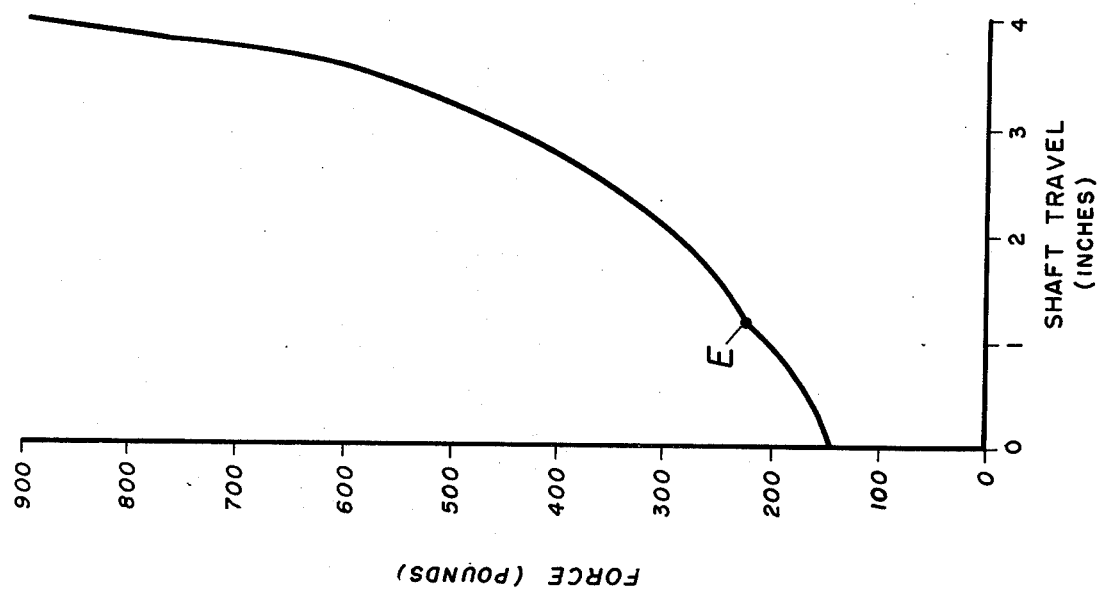
FIG. 5 graphically illustrates "air spring rate" of the shock absorber.

FIG. 5 graphically illustrates certain operational characteristics of the shock absorber. For example, assuming chamber 17 has been air-pressurized to approximately 97 psi and that bladder 30 has been air-pressurized to approximately 150 psi, the illustrated curve represents the force felt by piston rod 21. It should be noted that with an increase in force imposed on the shaft upon travel thereof that an "equalization point" E is reached wherein the low pressure of 97 psi has risen to equal the higher pressure of 150 psi.

At some point in the compression travel of rod 21, the pressure in chamber 17 will rise to equal the pressure in bladder 30. Further compression travel beyond this point results in displacement of oil from chamber 17 to chamber 43 via passage 44 and ports 45. This action is simultaneous with the flow of oil from chamber 17 to chamber 42 as described above. Such action occurs at point E in FIG. 5, as further described hereinafter.

Figure 6:
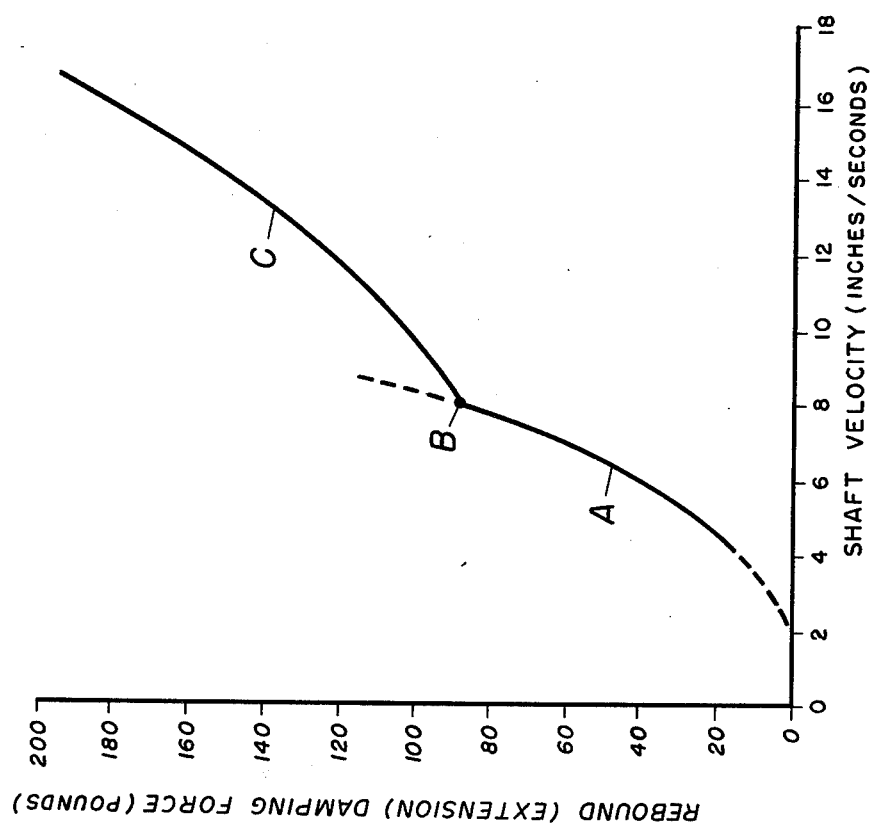
FIG. 6 graphically illustrates rebound damping characteristics of the shock absorber.

Assuming extension of the shock absorber from its FIG. 1 retracted condition, oil in chamber 42 will meter through orifice means 47 in a controlled manner to chamber 17. This metering function is illustrated by portion A of the curve in FIG. 6 which plots rebound damping force versus shaft velocity. In this example, it is assumed that orifice means 47 has a 0.145 in. diameter and that spring 53 provides a 3.1 lbs. preload on ball 51 at 0.325 in. compressed length of the spring.

At point B in the curve, check valve means 50 will open to cooperate with orifice means 47 to also meter fluid from chamber 42 to chamber 17 upon further extension of the shock absorber. Portion C of the curve thus illustrates the combined metering functions. It should be particularly noted that portion C of the curve is substantially less steep than that of portion A thereof, whereby highly advantageous extension dampening enables the rear wheel of the motorcycle to maintain substantial ground contact, while yet providing controlled handling characteristics for the rider.

I claim:

1. In a shock absorber adapted for use on motorcycles and the like comprising a tubular housing, a piston reciprocally mounted in said housing and having a ring mounted on a head thereof to define first and second chambers between said head and said housing on either side of said head retaining oil therein, first check valve means for introducing air into said first chamber for pressurizing said first chamber an inflated bladder, defining a closed chamber therein adapted to be filled with air, disposed in a hollow rod of said piston and defining a third chamber between said bladder and said piston in open communication with said first chamber, second check valve means for introducing air into said closed chamber for pressurizing the closed chamber, a continuously open orifice means formed through said head to meter said oil from said second chamber to said first chamber upon extension of said shock absorber, the improvement comprising check valve means mounted in said head at a position thereon separated from said orifice means for preventing communication of said oil from said first chamber to said second chamber upon compression of said shock absorber and for cooperating with said orifice means to open to also meter said oil from said second chamber to said first chamber at a controlled rate upon extension of said shock absorber and when the differential pressure of said oil between said first and second chambers exceeds a predetermined level.

2. The shock absorber of claim 1 further comprising a plurality of circumferentially disposed ports formed axially through said head and valve means for normally closing said ports and for opening to communicate said first and second chambers upon compression of said shock absorber.

3. The shock absorber of claim 1 wherein said orifice means and said check valve means in said head are diametrically opposed on said head.

4. The shock absorber of claim 1 wherein said check valve means in said head comprises a ball reciprocally mounted in said head, and a semi-spherical seat defined in said head and having said ball normally seated thereon.

5. The shock absorber of claim 4 wherein said check valve means in said head further comprises spring means mounted in said head for normally urging said ball into engagement with said seat and clamping means secured on said piston and disposed in overlying relationship relative to said spring means for maintaining said spring means in position on said head.

6. The shock abosrber of claim 5 wherein said clamping means comprises a ring having at least one retaining lug formed thereon and disposed within a recess defined on said head for preventing circumferential displacement of said ring means relative to said head.

7. The shock absorber of claim 5 wherein said spring means is mounted in a chamber defined in said head and further comprising at least one slot means defined on a side of such chamber for communicating said first and second chambers upon opening of said check valve means in said head.

8. The shock absorber of claim 4 further comprising means defining a radial passage formed on an underside of said head communicating said second chamber with the seat of said check valve means in said head.

9. The shock absorber of claim 1 further comprising an annular cushioning ring means secured on said rod, below said head, for preventing direct contact between said head and said housing.

10. The shock absorber of claim 9 further comprising an annular spacer ring mounted on said rod and disposed between said head and said cushioning ring means.

11. The shock absorber of claim 10 wherein said spacer ring has an upper frusto-conically shaped surface formed thereon to define an annular spacing between said ring and said head.

* * * * *